June 4, 1963  N. B. DRAKE  3,092,412

GRAB HOOK

Filed July 17, 1961

INVENTOR,
NORMAN B. DRAKE.

BY Cohn and Powell
ATTORNEYS.

United States Patent Office 3,092,412
Patented June 4, 1963

3,092,412
GRAB HOOK
Norman B. Drake, 11050 Valdamere Drive,
St. Louis, Mo.
Filed July 17, 1961, Ser. No. 124,520
6 Claims. (Cl. 294—66)

This invention relates generally to improvements in a grab hook, and more particularly to improvements in a compact, foldable utility hook especially adapted for use by boatmen, fishermen and sportsmen.

An important object is to provide a grab hook that is light in weight, highly durable, of simple construction, inexpensive to manufacture, and with its component parts so associated that it may be disassembled completely, or the flukes thereof folded or collapsed into compact form to facilitate storage or packaging, and to minimize risk of personal injury.

Other important advantages expressed in terms of usage are realized by the provision of a utility hook that may be attached to a line or pole, and thus used efficiently as a gaff, a grappling hook and for numerous other purposes, and which is designed so that it may be used to drag under water for lost objects, and frequently used by small boat operators as a grab hook above water as for anchoring a boat in a desired position by engagement with a log or other fixed mass.

Still another important object is realized by the structural arrangement and connection of the flukes of the grab hook which enable the flukes to be changed quickly between an operative position and an inoperative or folded position, the grab hook being quickly prepared for use by arranging the flukes radially of the body, and then tightening a wedge nut against the flukes, which in cooperation with the associated parts locks the flukes at the desired angles.

The invention may be summarized best by reference to a currently preferred commercial embodiment, as comprised of a tubular body, an axial rod extending through and usually beyond both ends of the tubular body, together with flukes, portions of which provide divergent, radially-extended hooks in the lower end region of the body, together with screw thread clamping means coacting with threads on the rod for maintaining such parts in assembly and by preference enabling the flukes to be folded and arranged in groups so that the assembly may be easily carried in a boat, tackle box or otherwise in a relatively flat form or package.

The foregoing and numerous other objects and advantages of the invention will more clearly appear from the following detailed description of a preferred embodiment, particularly when considered in connection with the accompanying drawing, in which.

Figure 2:
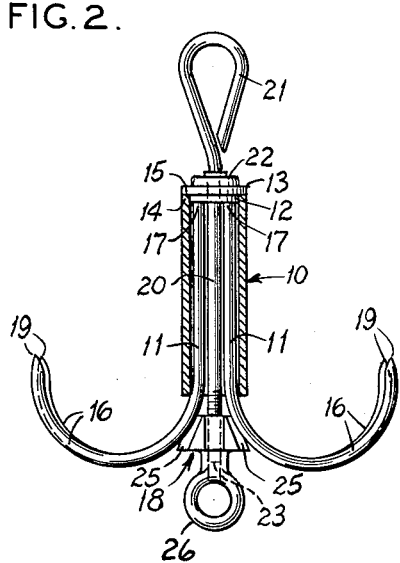
FIG. 2 is a side elevational view, partly in cross section, of the grab hook as shown in FIG. 1.

Referring now by characters of reference to the drawing, and first to FIG. 2, it is seen that the grab hook assembly includes as one of its major elements and as a central body, an open end tubular member generally indicated at 10. The lower end of the tubular body 10 enables the introduction thereinto of a plurality of rectilinear shank portions 11, each of which forms a part of one of the flukes later to be described in detail.

The upper end of the tubular body 10 is so proportioned as to receive a reduced cylindrical boss portion 12 constituting an abutment member and forming an integral part of circular collar 13, the boss portion 12 being seated within the end of the tubular body 10. The reduced cylindrical boss portion 12, adjacent the larger diameter collar 13 thereabove, results in a peripheral annular shoulder 14 that normally rests in abutting engagement upon the upper rim or margin 15 of the tubular body 10.

Figure 3:
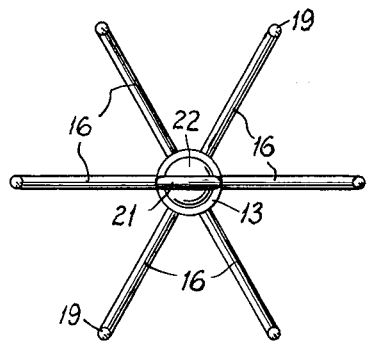
FIG. 3 is a top plan view of the grab hook, the flukes thereof being shown in operative position.

A plurality of flukes also constitute major elements of the grab hook assembly, each fluke comprising an exposed hook portion 16. The embodiment disclosed includes six such flukes, although it will be readily understood that more or less flukes may be conveniently utilized depending upon the needs and the fields of usage. Each of the flukes includes a shank portion 11 as above described, and a curved upwardly open hook portion 16. As is best seen in FIG. 3, the several hook portions 16 are arranged divergently relative to each other and individually bear a generally radial relation to the axis of the tubular body 10, when disposed in the extended operative position.

In the disclosed embodiment, the upper terminal portions 17 of the rectilinear shank portions 11 of the flukes, may abut the under surface of the boss portion 12. It will be observed, particularly from FIG. 2, that when the flukes are in operative position and the shank portions 11 thereof are in place in the tubular body 10, such shank portions 11 lie substantially mutually parallel, and lie substantially parallel to the longitudinal axis of the tubular body 10. The terminal ends 17 in FIG. 2 of the several fluke shank portions 11 will usually be held, as shown, in abutting engagement with the boss portion 12 of collar 13 by the upward force exerted by the screw thread connection that will be described in detail subsequently.

Figure 4:
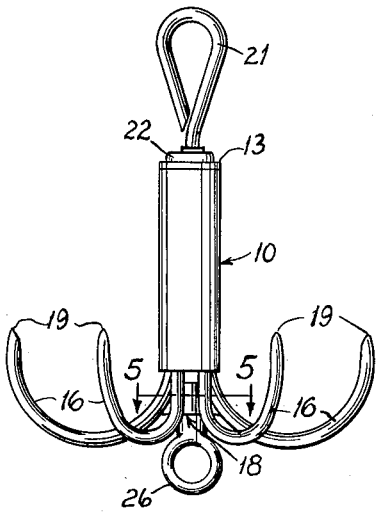
FIG. 4 is a side elevational view of the grab hook as shown in FIG. 3.

In the interest of brevity of description of the device when taken in connection with the accompanying drawing, the ends of the tubular body 10 and the other parts are at times referred to as upper and lower portions or elements. Such reference to position should of course not be taken in any limiting sense, either in the specification or claims, since it is obvious that the assembled device is not by any means restricted to use in a vertical position as shown in FIGS. 2 and 4.

A center rod 20 may constitute a continuation of a pole, gaff rod or the like, but it will in most cases be provided at its upper end with an eye 21, the eye possibly being replaced by a terminal screw thread (not shown) or other form of attachment or connection as dictated by the specific field of usage for which the device is desired. The eye 21 will normally provide a cordage connection.

Somewhat below the eye 21 of center rod 20 is a primary abutment 22 closely engaging the upper surface of the collar 13. The collar 13 is centrally apertured and is normally retained in place, as will appear, because of the engagement of the abutment 22 with the collar 13. The center rod 20 is located along the longitudinal axis of the tubular body 10 and projects at least to some extent below the lower portion of the body 10. In the selected embodiment, the lower end portion 23 of the center rod 20 is provided with screw threads that are complementary to the threads of a wedge nut generally designated at 18, and which will now be described in more detail.

Figure 5:
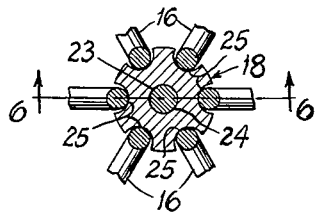
FIG. 5 is an enlarged fragmentary cross sectional view of the wedge nut, center rod and flukes as seen along line 5—5 of FIG. 4.
Figure 6:
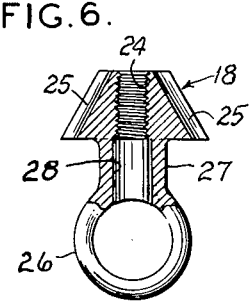
FIG. 6 is an enlarged cross sectional view of the wedge nut as seen along line 6—6 of FIG. 5.

The wedge nut 18 consists of a frusto-conical member of appreciable depth, the axial bore of which is threaded as mentioned. A series of downwardly divergent channels 25 extend in a generally depthwise direction along the periphery of the wedge nut 18, there being one such channel 25 for each of the flukes. Each channel 25 opens outwardly and is sectionally shaped so as to conform substantially to the external configuration of the internal ends of the hook portions 16 of the several flukes, the nut 18 being located in the general region of convergence of the radially disposed hook portions 16. The channels 25, as will be noted particularly from FIG. 5, are equally spaced about the periphery of the wedge nut 18.

The slope of the several channels 25 is preferably uniform and will correspond at least generally to the slope of the upturned inner ends of the hook portions 16 of the several flukes, so that, as the wedge nut 18 is drawn upwardly toward or into the bottom of the tubular body 10, there is imparted to the flukes a distinct expanding action of the nut 18 on the flukes. This spreading action is of course resisted and limited by the engagement of the lower shank ends with the inside surface of the wall forming the tubular body 10 at or near its lower end. This lower end portion of the tubular body 10 may, if desired, although not shown, be formed with a slight taper.

The free terminals of the hook portions 16 are preferably of a desired apex character and may be either edged or pointed as indicated at 19, according to specific field of usage.

Formed integrally with the wedge nut 18 and depending therefrom is a trip ring 26 adapted to be connected to a trip line (not shown) that may be pulled to facilitate disengagement of the flukes from snagged objects. The ring 26 includes a cylindrical body 27 having a center bore 28 aligned and communicating with the bore 24 of the wedge nut 18. Of course, it will be realized that the bore 28 accommodates the lower end of the center rod 20 as the wedge nut 18 is threadedly adjusted on the rod 20 incident to the expansion of the flukes into operative position.

It is thought that the manner of assembly and the manipulation of the component parts of the grab hook incident to transportation between the operative position and the folded or out-of-action position has become fully apparent from the foregoing detailed description of parts, but for completeness of disclosure it will be noted that the assembly of the grab hook will usually involve the insertion of the several flukes with their shank portions 11 extending upwardly into the tubular body 10. The center rod 20 is inserted through the center aperture of the collar 13 and the rod 20 is introduced through the top of the tubular body 10, following which the wedge nut 18 is threaded on the lower end of the rod 20.

If the fluke hook portions 16 are arranged radially, as in FIG. 3, and upon further threading of the center rod 20 as by actuation of the eye 21, or upon further threading of the wedge nut 18 by actuation of the ring 26, and if the wedge nut 18 is located so that the several channels 25 each partly embrace one of the inner hook ends of the flukes, the flukes are brought tightly up into the body 10 and the spreading action on the flakes by the nut 18 will hold the flukes in the predetermined, divergent, angularly spaced position.

Figure 1:
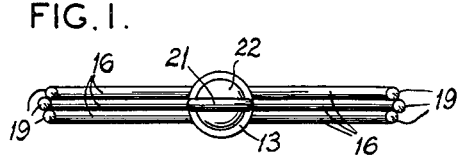
FIG. 1 is a top plan view of the grab hook, the flukes thereof being illustrated in a folded position.

If it is now desired to hold the flukes so as to render the device flat in form as for packaging, shipping or storage in a tackle box or the like, the eye 21 or the ring 26 is rotated a few turns in a direction to loosen the wedge nut 18 so as to release the inner hook ends from the channels 25. The flukes may now be rotated each about its own shank axis so as to bring the flukes into groups. For example and as shown, two groups of three flukes each are symmetrically disposed on opposite sides of the longitudinal axis of the assembly. From FIG. 1 it will appear that when thus folded, the grab hook assembly may be packaged for shipment in flat form, and will similarly occupy a space in a tackle box or other receptacle which in a package, need not be of greater thickness than the diameter of the tubular body 10.

By bringing into adjacence the several points or edges 19 in each of the groups of flukes, there is only a negligible hazard of personal injury or of damage to other equipment in the tackle box. Restoration of the folded device to its condition of use will, as now obvious, merely consist in again radially disposing the flukes and retightening the wedge nut 18 by means of the rod 20 and eye 21 or of the ring 26.

Although the invention has been described by making detailed reference to a single preferred embodiment, such detail is to be understood in an instructive, rather than in any restrictive sense, many variants being possible within the scope of the claims hereunto appended.

I claim as my invention:

1. In a grab hook, a tubular body, a plurality of flukes including hook portions angularly spaced apart and extending radially of the tubular body, the flukes including shank portions extending substantially throughout the length of the tubular body, a rod extending into the upper end of the tubular body, an abutment carried by the rod and engaging the upper end of the tubular body, and screw-thread means threadedly engaging the rod in the region of the lower end of the tubular body and in the zone of convergence of the flukes, said screw-thread means including a downwardly divergent camming surface engaging the flukes to expand the hook portions outwardly upon tightening of the screw-thread means on the rod, said rod and screw-thread means positioning the flukes in relation to the lower end of the tubular body.

2. In a foldable grab hook, a tubular body, a plurality of flukes, each having a curvilinear hook portion projecting radially of the lower end of the tubular body and each having a shank portion extending loosely into the tubular body, a wedge nut having a downwardly divergent camming surface located axially of the tubular body and in expanding engagement with the curvilinear hook portions of the several flukes substantially in the zone of their convergence, a rod extended axially of the tubular body, and means on said rod engaging the tubular body, the wedge nut threadedly engaging the rod to expand the flukes outwardly and retain the flukes in relation to the tubular body, and the wedge nut selectively releasing the flukes upon threaded adjustment on the rod to permit movement of the hook portions into lateral adjacence incident to folding.

3. The combination and arrangement of elements as recited by claim 2, but further characterized in that the wedge nut is provided with angularly spaced external channels disposed about the periphery of the nut and extending substantially radially, each of said channels being adapted to receive one of the curvilinear hook portions of said flukes.

4. In a grab hook, an open end tubular body, a plurality of flukes each having a curvilinear hook portion externally and radially projecting from the tubular body and a shank portion within the tubular body, a clamp rod of greater length than the tubular body and extending axially therethrough, a closure carried by the rod and engaging the upper end of the tubular body, the rod being threaded in the region of the lower end of the tubular body, a wedge nut threadedly engaging said rod, said nut being characterized by downwardly divergent sloping channels opening outwardly of its periphery, each said channel forming a seat for one of the curvilinear hook portions of said flukes, the rod and nut being adapted when in operative position to cause the flukes and said closure compressively to engage the tubular body with said rod under tension, whereby to maintain the spacing and position of the flukes with respect to the tubular body.

5. In a foldable grab hook, a tubular body, an axial rod of greater length than said body and extending therethrough, said rod including an attachment at its upper end, an abutment carried by the rod adjacent to and constituting a closure for the otherwise open end of said tubular body, the rod being threaded, a plurality of flukes, each of said flukes being characterized by a substantially arcuate hook portion, each said fluke including a substantially linear shank portion extending upwardly loosely into said body and having an end in abutment with said closure, a wedge nut of frusto-conical form disposed axially of and normally slightly below the lower end of the tubular body with its smaller end uppermost, the periphery of the wedge nut being characterized by a series of outwardly opened channels, each channel being of a transverse section conforming substantially to the external contour of and receiving the inner ends of the hook portions of the flukes, the wedge nut expanding the flukes outwardly into clamping engagement with the lower end of the tubular body upon tightening the nut on said rod, the wedge nut being so proportioned in respect to the lower diameter of the tubular body so as upon loosening the nut through actuation of the rod to permit the flukes to be disposed with at least certain of their hook portions in substantially adjacent parallel relation, whereby the hook portions and body are in substantially flat form.

6. In a foldable grab hook, a tubular body, an axial rod of greater length than said body and extending therethrough, said rod including an eye at its upper end, an abutment carried by the rod adjacent to and constituting a closure for the otherwise open end of said tubular body, the rod being threaded in the region of the lower end of the tube, a plurality of flukes, each of said flukes being characterized by a substantially arcuate hook portion, each said fluke including a substantially linear shank portion of slightly less length than, and extended upwardly into said body, and having an end in abutment with said closure, a wedge nut of frusto-conical form disposed axially of and normally slightly below the lower end of the tubular body with its smaller end uppermost, the periphery of the wedge nut being characterized by a series of angularly spaced, outwardly open, downwardly divergent channels, each channel being of a transverse section conforming substantially to the external contour of and receiving the inner ends of the hook portions of the flukes, the wedge nut expanding the flukes outwardly into clamping engagement with the lower end of the tubular body upon tightening the nut on said rod, the wedge nut being so proportioned with respect to the lower diameter of the tubular body so as upon relative loosening of the nut on the rod to permit the flukes to be disposed with at least certain of their hook portions in substantially adjacent parallel relation, whereby the grab hook requires only a depth of package not materially exceeding the diameter of the tubular body and thereby enabling storage and shipment in a substantially flat form.

References Cited in the file of this patent

UNITED STATES PATENTS

| | | |
|---|---|---|
| 289,508 | Dawson | Dec. 4, 1883 |
| 1,334,839 | Cole | Mar. 23, 1920 |
| 2,490,583 | Dunkelberger | Dec. 6, 1949 |
| 2,521,139 | Walsh et al. | Sept. 5, 1950 |
| 2,602,689 | Matz | July 8, 1952 |
| 2,783,580 | Balboni | Mar. 5, 1957 |